United States Patent
Otiaba et al.

(10) Patent No.: US 11,425,936 B2
(45) Date of Patent: Aug. 30, 2022

(54) ELECTRONIC AEROSOL PROVISION SYSTEM

(71) Applicant: NICOVENTURES HOLDINGS LIMITED, London (GB)

(72) Inventors: Kenny Otiaba, London (GB); David Leadley, London (GB)

(73) Assignee: Nicoventures Holdings Limited, London (GB)

(*) Notice: Subject to any disclaimer, the term of this patent is extended or adjusted under 35 U.S.C. 154(b) by 68 days.

(21) Appl. No.: 16/610,588

(22) PCT Filed: May 1, 2018

(86) PCT No.: PCT/GB2018/051159
§ 371 (c)(1),
(2) Date: Nov. 4, 2019

(87) PCT Pub. No.: WO2018/203044
PCT Pub. Date: Nov. 8, 2018

(65) Prior Publication Data
US 2020/0154771 A1   May 21, 2020

(30) Foreign Application Priority Data

May 5, 2017   (GB) .................................. 1707194

(51) Int. Cl.
*A24F 40/51*   (2020.01)
*A24F 40/53*   (2020.01)
(Continued)

(52) U.S. Cl.
CPC .............. *A24F 40/51* (2020.01); *A24F 40/40* (2020.01); *A24F 40/53* (2020.01); *H01B 7/04* (2013.01);
(Continued)

(58) Field of Classification Search
CPC .......... A24F 40/10; A24F 40/40; A24F 40/51; A24F 40/53; H01B 7/04; H01B 7/0838
See application file for complete search history.

(56) References Cited

U.S. PATENT DOCUMENTS

| 6,095,153 A | 8/2000 | Kessler |
| 10,314,339 B2 | 6/2019 | Fraser |

(Continued)

FOREIGN PATENT DOCUMENTS

| CN | 104770884 | 7/2015 |
| CN | 105029713 | 11/2015 |

(Continued)

OTHER PUBLICATIONS

International Search Report and Written Opinion, Application No. PCT/GB2018/051159, dated Jul. 27, 2018, 22 pages.
(Continued)

*Primary Examiner* — Timothy J Thompson
*Assistant Examiner* — Rhadames Alonzo Miller
(74) *Attorney, Agent, or Firm* — Patterson Thuente Pedersen, P.A.

(57) ABSTRACT

An electronic aerosol provision system includes a vaporizer for generating an aerosol using electrical power; a battery for supplying electrical power to the vaporizer and to other components of the electronic aerosol provision system; a flat, flexible cable having a laminated structure and incorporating multiple conductor lines for transmitting electrical power and/or signals; and a temperature sensor incorporated into the flat, flexible cable and located adjacent the battery for sensing the temperature of the battery. The electronic aerosol provision system is configured to detect an error condition if the sensed temperature of the battery goes (Continued)

outside a specified operating range; and in response to such detection, to reduce or cease the supply of electrical power from the battery.

20 Claims, 7 Drawing Sheets

(51) Int. Cl.
    *H02J 7/00*         (2006.01)
    *H01B 7/04*         (2006.01)
    *H01B 7/08*         (2006.01)
    *A24F 40/40*       (2020.01)
    *A24F 40/10*       (2020.01)

(52) U.S. Cl.
    CPC ...... *H01B 7/0838* (2013.01); *H02J 7/007194* (2020.01); *A24F 40/10* (2020.01)

(56) References Cited

U.S. PATENT DOCUMENTS

| | | | |
|---|---|---|---|
| 11,160,312 B2 | 11/2021 | Akao et al. | |
| 2002/0017299 A1* | 2/2002 | Hickle | G16H 20/17 128/204.21 |
| 2003/0226837 A1* | 12/2003 | Blake | A24F 40/50 219/260 |
| 2004/0168513 A1 | 9/2004 | Aoshima et al. | |
| 2009/0216910 A1* | 8/2009 | Duchesneau | H04L 41/04 709/250 |
| 2011/0226236 A1 | 9/2011 | Buchberger | |
| 2013/0230755 A1* | 9/2013 | Dimmock | H01M 50/209 429/90 |
| 2013/0240385 A1* | 9/2013 | Loehrke | B65B 57/005 206/205 |
| 2014/0130796 A1 | 5/2014 | Qiuming | |
| 2014/0212703 A1* | 7/2014 | Kobori | H01M 4/364 429/7 |
| 2014/0249601 A1* | 9/2014 | Bachinski | A61N 1/0492 607/59 |
| 2014/0299125 A1 | 10/2014 | Batmark | |
| 2014/0301721 A1 | 10/2014 | Ruscio | |
| 2014/0316630 A1* | 10/2014 | Kohlberger | B60W 10/30 701/22 |
| 2015/0114409 A1 | 4/2015 | Brammer | |
| 2015/0320116 A1* | 11/2015 | Bleloch | A24F 40/465 219/628 |
| 2016/0157524 A1 | 6/2016 | Bowen et al. | |
| 2016/0213066 A1 | 7/2016 | Zitzke et al. | |
| 2017/0013879 A1* | 1/2017 | Frisbee | A61M 11/042 |
| 2017/0175657 A1* | 6/2017 | Fei | F02D 41/0025 |
| 2017/0207499 A1* | 7/2017 | Leadley | A24F 40/40 |
| 2017/0250552 A1* | 8/2017 | Liu | A24F 40/53 |
| 2017/0251718 A1* | 9/2017 | Armoush | H05B 6/105 |
| 2018/0049469 A1 | 2/2018 | Kaufman et al. | |
| 2018/0256834 A1 | 9/2018 | Hepworth | |
| 2018/0303161 A1 | 10/2018 | Bilat | |
| 2019/0020012 A1* | 1/2019 | Ju | H01M 10/425 |

FOREIGN PATENT DOCUMENTS

| | | | |
|---|---|---|---|
| CN | 105029713 A | * | 11/2015 |
| CN | 105376877 A | | 3/2016 |
| CN | 105852224 A | | 8/2016 |
| CN | 106418724 A | | 2/2017 |
| DE | 202014101125 | | 3/2014 |
| DE | 202014101126 | | 4/2014 |
| GB | 2528711 | | 2/2016 |
| JP | 2004212102 A | | 7/2004 |
| JP | 2012138284 A | | 7/2012 |
| JP | 2012527222 A | | 11/2012 |
| JP | 2014508653 A | | 4/2014 |
| JP | 2015513922 A | | 5/2015 |
| JP | 2016045718 A | | 4/2016 |
| JP | 2017518751 A | | 7/2017 |
| JP | 2018510630 A | | 4/2018 |
| KR | 20130108825 A | | 10/2013 |
| WO | WO 2014/144678 | | 9/2014 |
| WO | WO 2015/038981 | | 3/2015 |
| WO | WO-2015189556 A1 | | 12/2015 |
| WO | WO 2016/058189 | | 4/2016 |
| WO | WO 2016/156217 | | 10/2016 |
| WO | 2017055793 A1 | | 4/2017 |

OTHER PUBLICATIONS

Application and File History for U.S. Appl. No. 16/623,501, filed Dec. 17, 2019, Inventor: Mullin et al.
International Search Report, Application No. PCT/GB2018/051713, dated Sep. 27, 2018, 3 pages.
Russian Decision to Grant, Application No. 2019142742, dated Apr. 21, 2020, 12 pages.
International Preliminary Report on Patentability, Application No. PCT/GB2018/051159, dated Nov. 14, 2019, 8 pages.
International Preliminary Report on Patentability, Application No. PCT/GB2018/051713, dated Jan. 2, 2020.
Great Britain Search Report, Application No. GB1709982.1, dated Feb. 13, 2018, 3 pages.
Office Action For Japanese Application No. 2019-566878, dated May 11, 2021, 18 pages.
Office Action dated Apr. 29, 2021 for Korean Application No. 10-2019-7032197, 21 pages.
Decision to Grant a Patent dated Mar. 9, 2021 for Japanese Application No. 2019-560111, 5 pages.
Office Action For Chinese Application No. 201880028893.7, dated Nov. 2, 2021, 17 pages.
Search Report dated Mar. 1, 2021 for Japanese Application No. 2019-566878, 24 pages.
Search Report dated Feb. 22, 2021 for Japanese Application No. 2019-560111, 24 pages.
Notice of Allowance dated Apr. 19, 2022 for Korean Application No. 10-2019-7037656, 3 pages.

* cited by examiner

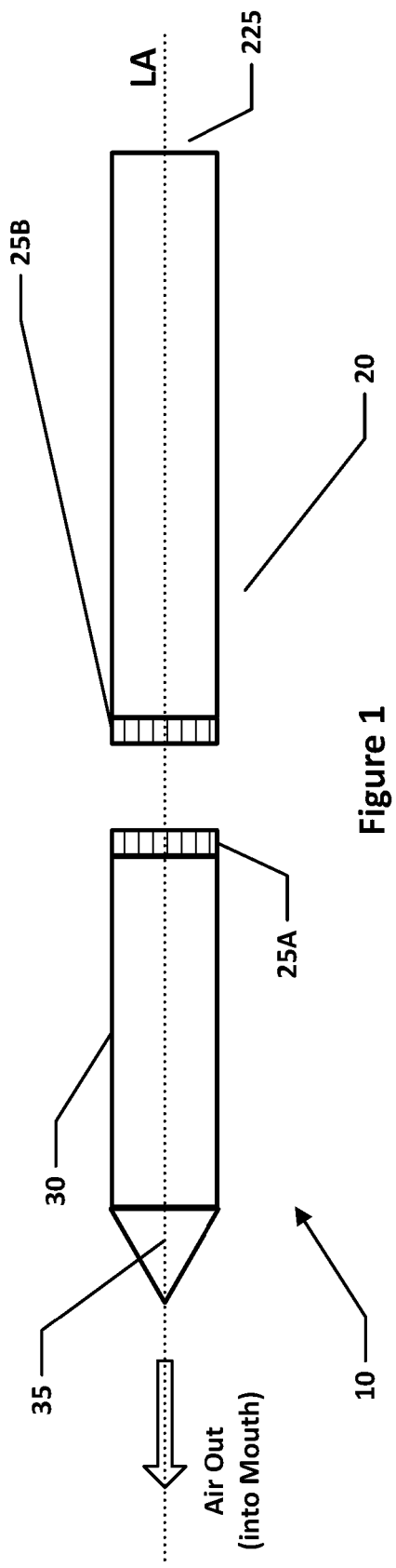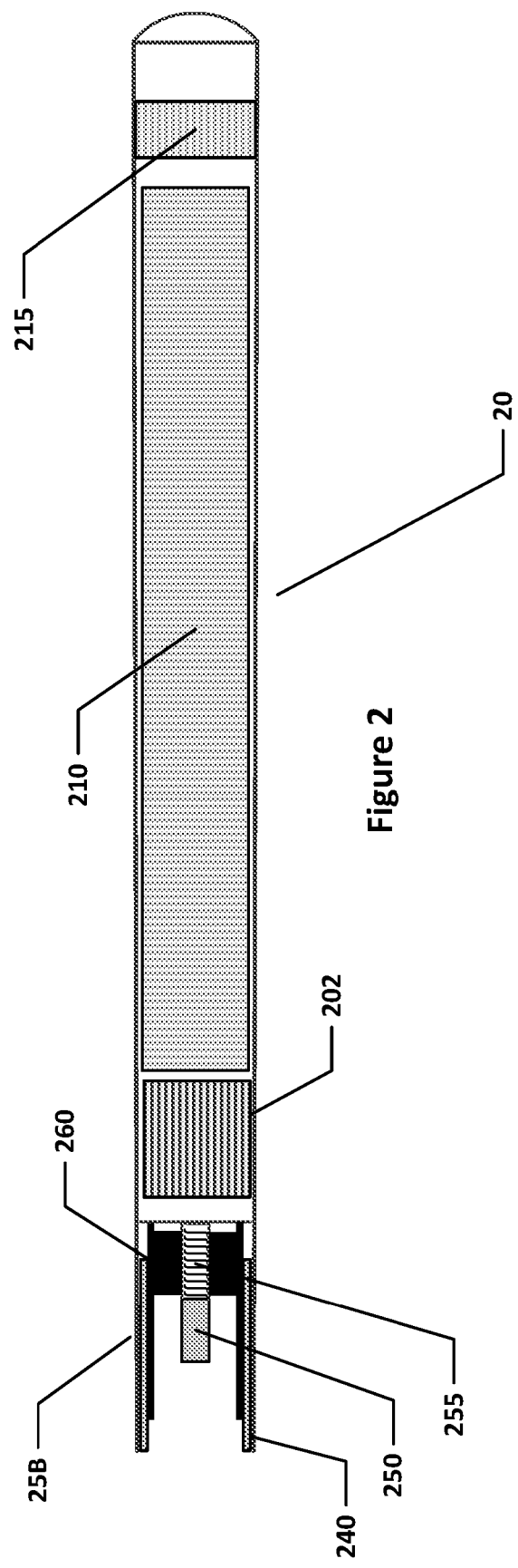

ELECTRONIC AEROSOL PROVISION SYSTEM

PRIORITY CLAIM

The present application is a National Phase entry of PCT Application No. PCT/GB2018/051159, filed May 1, 2018, which claims priority from GB Patent Application No. 1707194.5, filed May 5, 2017, each of which is hereby fully incorporated herein by reference.

FIELD

The present disclosure relates to electronic aerosol provision systems such as nicotine delivery systems, e.g. electronic cigarettes and the like.

BACKGROUND

Electronic aerosol provision systems such as electronic cigarettes (e-cigarettes) generally contain a vapor precursor, e.g. a reservoir of liquid (e-liquid) including a formulation such as nicotine, from which an aerosol (vapor) is generated. An electronic aerosol provision system may comprise a heater arranged to receive liquid from the reservoir, for example through wicking or capillary action. When a user inhales on the device, electrical power is supplied to the heater to vaporize liquid from the vicinity of the heater to generate an aerosol for inhalation by the user through a mouthpiece.

Such devices are usually provided with one or more air inlet holes located away from the mouthpiece end of the system. When a user sucks on a mouthpiece (located at the mouthpiece end of the system), air is drawn in through the inlet hole(s) and past the liquid that is being vaporized. This air flow continues along a flow path to the mouthpiece opening, carrying some of the aerosol (vapor) for inhalation by the user.

Electronic aerosol provision systems typically include their own power source, such as a rechargeable battery. The battery supplies the power to the system, including to the heater to vaporize the liquid. Such a battery may have a range of normal operating temperatures, e.g., between 0° C. and 60° C. If the battery becomes too hot, e.g., from prolonged use or from a malfunction of the system, the battery may potentially exceed this normal operating range of temperature. Such an excessive temperature may potentially cause damage to the battery itself and/or to other components of the electronic aerosol provision system.

SUMMARY

Disclosed herein is an electronic aerosol provision system comprising: a vaporizer for generating an aerosol using electrical power; a battery for supplying electrical power to the vaporizer and to other components of the electronic aerosol provision system; a flat, flexible cable having a laminated structure and incorporating multiple conductor lines for transmitting electrical power and/or signals; and a temperature sensor incorporated into the flat, flexible cable and located adjacent the battery for sensing the temperature of the battery. The electronic aerosol provision system is configured to detect an error condition if the sensed temperature of the battery goes outside a specified operating range; and in response to such detection, to reduce or cease the supply of electrical power from the battery.

Also disclosed herein are a method for operating such an electronic aerosol provision system, and a control unit for use in such an electronic aerosol provision system.

BRIEF DESCRIPTION OF THE DRAWINGS

Embodiments of the disclosure will now be described, by way of example only, with reference to the accompanying drawings, in which:

FIG. 1 is a schematic (exploded) diagram illustrating an electronic aerosol provision system in accordance with some embodiments of the disclosure.

FIG. 2 is a schematic diagram of a control unit of the electronic aerosol provision system of FIG. 1 in accordance with some embodiments.

DETAILED DESCRIPTION

Figure 3:
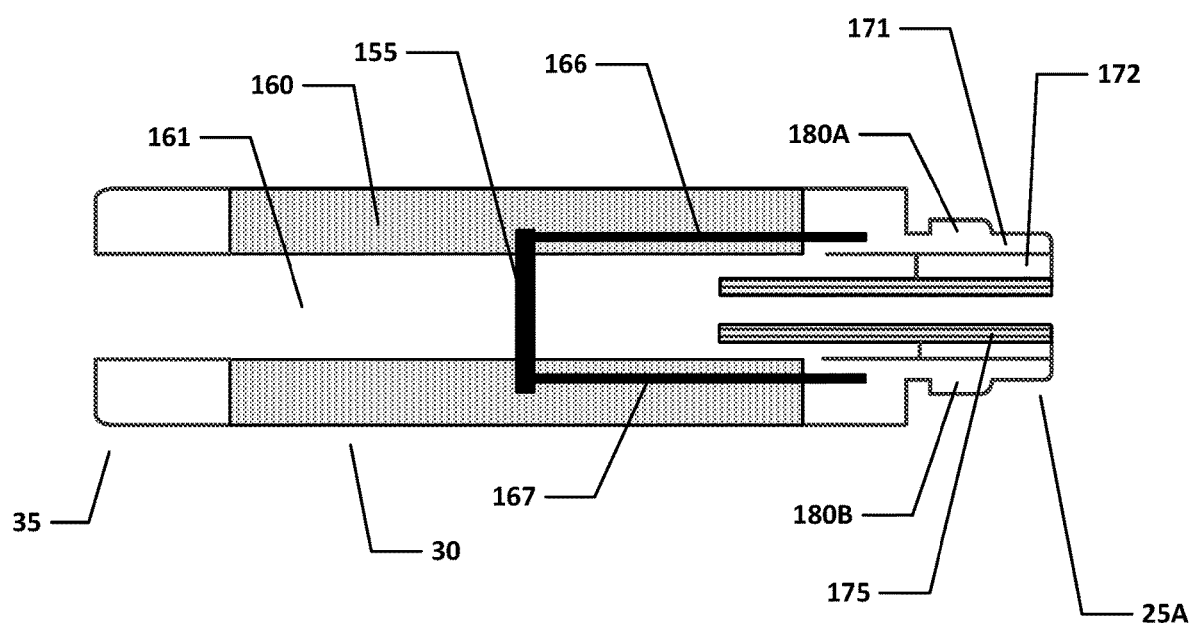
FIG. 3 is a schematic diagram of a cartomizer of the electronic aerosol provision system of FIG. 1 in accordance with some embodiments.

Aspects and features of certain examples and embodiments are described herein. Some aspects and features of certain examples and embodiments may be implemented conventionally and these are not described in detail in the interests of brevity. It will thus be appreciated that aspects and features of apparatus and methods discussed herein which are not described in detail may be implemented in accordance with any conventional technique for implementing such aspects and features.

Throughout the following description, the term "e-cigarette" is used interchangeably with electronic aerosol (vapor) provision system and other similar terms.

FIG. 1 is a schematic diagram illustrating an e-cigarette 10 in accordance with some embodiments of the disclosure. The e-cigarette 10 has a generally cylindrical shape, extending along a longitudinal axis indicated by dashed line LA, and comprises two main components, namely a control unit 20 and a cartomizer (cartridge) 30. The cross-section through the cylinder, i.e. in a plane perpendicular to the line LA, may be circular, elliptical, square, rectangular, hexagonal, or some other regular or irregular shape as desired. It should also be appreciated that embodiments of e-cigarettes 10 may have shapes other than generally cylindrical, e.g., a generally ellipsoidal shape.

The cartomizer 30 includes an internal chamber containing a reservoir of liquid formulation including e.g. nicotine, a vaporizer (such as a heater), and a mouthpiece 35. The cartomizer 30 may further include a wick or similar facility to transport liquid from the reservoir to the heater.

The control unit 20 includes a power source, such as a battery or cell to provide power to the e-cigarette 10 and control circuitry (discussed in more detail below) for generally controlling various functions of the e-cigarette 10. When the heater receives power from the battery (not shown in FIG. 1), as controlled by the control circuitry, the heater vaporizes the liquid and this vapor (aerosol) is then inhaled by a user through the mouthpiece 35.

In the embodiment shown in FIG. 1, the control unit 20 and cartomizer 30 are detachable from one another by separating in a direction parallel to the longitudinal axis LA, but are joined together when the device 10 is in use by a connection, indicated schematically as 25A (on the cartomizer 30) and 25B (on the control unit 20), to provide mechanical and electrical connectivity between the control unit 20 and the cartomizer 30. In some embodiments, electrical induction may be employed to transfer power from the control unit 20 to the cartomizer 30. The connectors 25A and 25B are used to provide a bayonet fitting for connecting the cartomizer 30 to the control unit 20. It will be appreciated that other embodiments may use a different form of connection between the control unit 20 and the cartomizer 30, such as a snap fit or a screw connection.

The connection 25B on the control unit 20 that is used to connect to the cartomizer 30 may also serve as a socket for connecting a charging device (not shown) when the control unit is detached from the cartomizer 30. In some embodiments, the control unit 20 may be provided with a conductive contact for re-charging at or near the end opposite the connection 25B, for example, in the form of a mini or micro USB port. In this case, the control unit 20 need not be separated from the cartomizer 30 to (re)charge the battery using such a port In many devices, the cartomizer 30 is detached from the control unit 20 for disposal of the cartomizer 30 when the supply of e-liquid is exhausted—and replaced with another cartomizer, if so desired. In contrast, the control unit 20 is normally re-usable with a succession of cartomizers.

FIGS. 2 and 3 provide schematic diagrams of the control unit 20 and cartomizer 30 respectively of the e-cigarette of FIG. 1. Note that various components and details, e.g. such as wiring and more complex shaping, have been omitted from FIGS. 2 and 3 for reasons of clarity. As shown in FIG. 2, the control unit 20 includes a battery 210 and control circuitry including a circuit board 215 to provide control functionality for the e-cigarette, e.g. by provision of a (micro) controller, processor, ASIC or similar form of control chip. The control chip may be mounted to a printed circuit board (PCB). The battery 210 is typically cylindrical in shape, and has a central axis that lies along, or at least close to (and generally parallel with), the longitudinal axis LA of the e-cigarette.

In FIG. 2, the circuit board 215 is shown longitudinally spaced from the battery 210, in the opposite direction to the cartridge 30 (see FIG. 1). However, the skilled person will be aware of various other potential locations for the circuit board 215, for example, at the opposite end of the battery 210 to that shown. A further possibility is that the circuit board 215 lies along a side of the battery 210. For example, with an e-cigarette 10 having a rectangular cross-section, the circuit board 215 might be located adjacent one outer wall of the control unit 20, with the battery 210 slightly offset towards the opposite outer wall of the control unit 10. Note also that the functionality provided by the circuit board 215 may be split across multiple circuit boards and/or across components which are not mounted to a PCB, and these additional components and/or PCBs can be located as appropriate within the e-cigarette 10. For example, the functionality of the circuit board 215 for controlling the (re)charging functionality of the battery 210 may be provided separately (e.g. on a different PCB) from the functionality for controlling the discharge—i.e. for providing power to the heater of the cartomizer 30 from the battery 210.

The circuit board 215 in the example shown also includes a sensor unit. If a user inhales on the mouthpiece 35, air is drawn into the e-cigarette 10 through one or more air inlet holes (not shown in FIGS. 1 and 2). The sensor unit, which may include a pressure sensor and/or microphone, detects this airflow, and in response to such a detection, the circuit board 215 provides power from the battery 210 to the heater in the cartomizer 30 (this is generally referred to as puff actuation). In other implementations, the e-cigarette 10 may be provided with a button or switch that a user can operate to provide power from the battery to the heater. Although not shown explicitly in FIGS. 1 and 2, the control unit 20 also includes an electrical connector having an integrated temperature sensor, as discussed later with reference to FIGS. 4 through 7.

As shown in FIG. 3, the cartomizer 30 includes an air passage 161 extending along the central (longitudinal) axis of the cartomizer 30 (and e-cigarette 10) from the mouthpiece 35 to the connector 25A, which joins the cartomizer to the control unit 20. A reservoir of e-liquid 160 is provided around the air passage 161. This reservoir 160 may be implemented, for example, by providing cotton or foam soaked in the e-liquid, or in other implementations, the e-liquid may be held freely within a suitable container. The cartomizer 30 also includes a heater 155 in the form of a coil for heating e-liquid from reservoir 160 to generate vapor to flow through air passage 161 and out through mouthpiece 35. The heater 155 is powered through lines 166 and 167, which are in turn connected to opposing polarities (positive and negative, or vice versa) of the battery 210 via connector 25A.

Although not shown in FIG. 3, some embodiments of the cartomizer 30 may include a heater temperature sensor configured to sense a temperature of the heater 155. The heater temperature sensor is disposed in the cartomizer 30 but coupled to the circuit board 215, e.g., through connectors 25A and 25B. Accordingly, the circuit board 215 is able to control the power supplied to the heater 155 based on the current temperature of the heater 155.

As mentioned above, the connectors 25A and 25B provide mechanical and electrical connectivity between the control unit 20 and the cartomizer 30. As seen in FIG. 2, the connector 25B includes two electrical terminals, an outer contact 240 and an inner contact 250, which are separated by insulator 260. The connector 25A likewise includes an inner electrode 175 and an outer electrode 171, separated by insulator 172, as seen in FIG. 3). When the cartomizer 30 is connected to the control unit 20, the inner electrode 175 and the outer electrode 171 of the cartomizer 30 mechanically (and hence electrically) engage the inner contact 250 and the outer contact 240 respectively of the control unit 20. The inner contact 250 is mounted on a coil spring 255 so that during the mating (connection) process, the inner electrode 175 pushes against the inner contact 250 to compress the coil spring 255, thereby helping to ensure good mechanical and electrical contact when the cartomizer 30 is connected to the control unit 20.

The cartomizer connector 25A of FIG. 3 is also provided with two lugs or tabs 180A, 180B, which extend in opposite directions away from the longitudinal axis of the e-cigarette. These tabs are used to provide the bayonet fitting for connecting the cartomizer 30 to the control unit 20.

Figure 4:
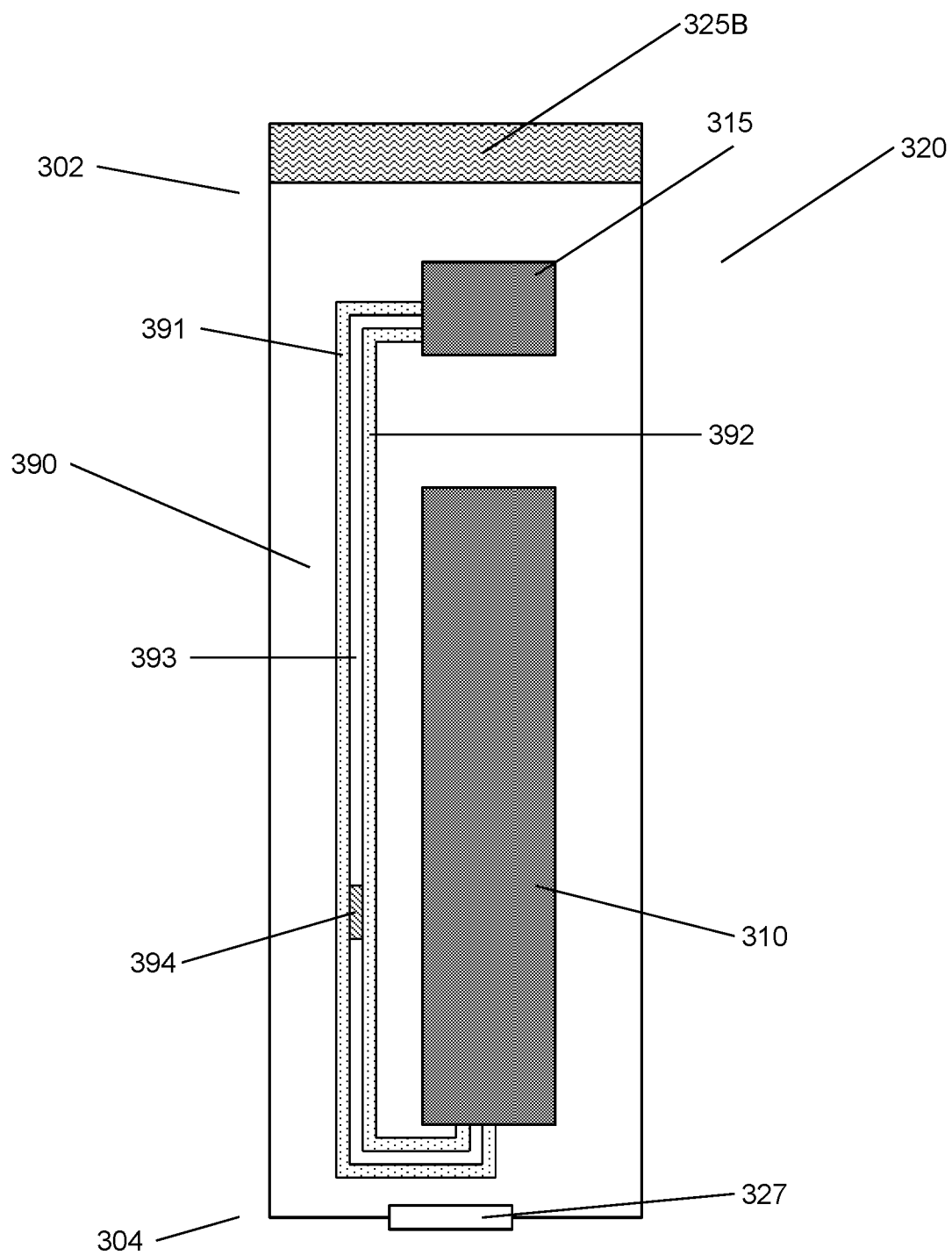
FIG. 4 is a schematic diagram of a control unit, such as for use in the electronic aerosol provision system of FIG. 1, the control unit including a flexible electrical connector having an integrated temperature sensor in accordance with some embodiments.

FIG. 4 shows schematically, a control unit 320 in accordance with some embodiments. Control unit 320 is generally similar to control unit 20 as discussed above. Various components and details, e.g. such as wiring and more complex shaping, have been omitted from FIG. 4 for reasons of clarity.

Control unit 320 comprises control circuitry, which includes circuit board 315, as well as a battery 310, external connectors 325B, 327, and an electrical connector 390. The circuit board 315 is substantially similar to circuit board 215 described above, and is configured to control one or more functions of the electronic aerosol provision system, e.g., controlling power supplied from the battery 310 to the heater 155 of cartomizer 30. As above, the functions of the circuit board 315 may be spread over one or more physical components, e.g., one or more PCBs. For example, one PCB may be provided for controlling the supply of power to the heater of the cartomizer 30, while another, physically separate, PCB may be provided for controlling the re-charging of the battery 310 from an external source. Note that in the implementation shown in FIG. 4, the circuit board 315 lies between the battery 310 and a connector 325B for attaching to a cartomizer.

The battery 310 is substantially similar to battery 210 as described above. Generally the battery 310 supplies power to the control circuitry and other components of the e-cigarette 10, and may be recharged by connecting to a suitable re-charging system, for example via connection or port 327 (as described in more detail below). In some embodiments, the battery 310 may be a lithium-Ion battery.

The connector 325B is located at one end 302 of control unit 320, and is similar to connector 25B shown in FIG. 1. The control unit 320 is provided with a further connector 327, which is located at the tip end 304, opposite to the end 302 (the tip end 304 is therefore furthest from mouthpiece 35). The connector 327 is used to connect to an external power source, such as a charging system, for providing power to re-charge the battery 310. For example, the connection 327 may be a (micro or mini) USB port or similar that enables connection to mains electricity or other power supply via a suitable lead and adapter. Such a connection may also facilitate data transfer, such as data pertaining to the usage of the electric aerosol provision system, when connected to a personal computer or the like. Another possibility is that the connection 327 may be a conductive plate that enables inductive power transfer when placed in the vicinity of a suitably configured inductive charging system.

It will be appreciated that the positioning of the battery 310 and the circuit board 315 within the control unit 320 shown in FIG. 4 is one of many possible configurations. For example, the circuit board 315 may be disposed closer to the tip end 304 than the battery 310; see, for example, FIG. 2. In other configurations, the circuit board 315 may be placed to the side of the battery 310, e.g., to the left or right in FIG. 4. Accordingly, the positioning of the circuit board 315 is not limited to the particular configuration shown, but may be arranged depending upon the spatial limitations and construction of a given control unit 320.

The control unit 320 is provided with an electrical connector 390 that provides an electrical connection between the battery 310 and the circuit board 315. The electrical connector 390 is shown in FIG. 4 as extending from a lower part of the battery 310, i.e. nearest tip end 304, along the length of the battery 310, and to the circuit board 315. However, one skilled in the art will appreciate that the electrical connector 390 may be routed as appropriate for the relative positions of the battery 310 and circuit board 315 within the control unit 320. A further possibility is that the electrical conductor 390 may be used to link the battery 310 and the connector 325B (with or without connecting to the PCT 315), or to provide any other desired connectivity within control unit 320 for the transmission or electrical power and/or signals.

The electrical connector 390 comprises a flat flexible cable (FFC), also termed a flex cable. Such a flex cable is similar in some respects to a PCB, in that it may include (small) mounted components, and conductive tracks for electrically linking the components and supplying other conductive paths, e.g. for external connection. However, whereas a conventional PCB is formed with a solid substrate (board), a flex cable is formed on a flexible, laminated substrate. The use of a flex cable for the electrical connector 390 has various advantages, for example, the flex cable can be formed separately from the rest of control unit 320, and then incorporated (assembled) as a single component supporting multiple conductive paths into the e-cigarette (rather than say having to fit multiple wires individually into the control unit 320, which would be a more cumbersome procedure).

The flex cable 390 is shown in FIG. 4 such that the plane of the flat flexible conductor is perpendicular to the page—i.e. the flex cable is shown edge-on. It will be appreciated that FIG. 4 is not to scale, and for ease of understanding, the thickness of the flex cable is shown larger relative to the size of battery 310 than will be the case in most practical implementations. In addition, for ease of representation, the flex cable 390 is shown with angular corners at either end (to connect with the circuit board 315 and the tip end of the battery), however, in practice these corners would generally be smooth or rounded.

The flex cable is shown (highly schematically) in FIG. 4 as comprising a laminated structure formed from a conductive layer 393 sandwiched between a first electrical insulating layer 391 and a second electrical insulating layer 392. The conductive layer 393 typically includes a plurality of conductor tracks (not visible). Also mounted within the flex cable is a temperature sensor 394. Note that the first and second electrical insulating layers 391, 392 in effect provide a protective seal or coating for the conductive layer 393 and temperature sensor 394, and also provide electrical insulation of the conductive layer 393 and temperature sensor 394, e.g. from other components in the control unit 320.

The first and second electrical insulating layers 391 and 392 are formed of a flexible dielectric material. The same material, or different materials, may be used for each of the layers 391, 392, providing the flexibility and heat expansion properties of the materials of each layer are suitably matched. In some implementations, the second electrical insulating layer 392 (or conversely the first electrical insulating layer 391) may be omitted—this is then more closely analogous to a PCB which has a rigid substrate for a base, but which is open at the top. The use of a flexible material for connector 390 provides the ability to manipulate the electrical 390 into various different desired configurations or shapes. This can help the flexible connector (cable) 390 to make good use of limited space within the control unit 320, for example, to follow a curved path between other components inside the control unit 30.

Examples of a suitable flexible dielectric material for the first and/or second electrical insulating layers are polyester or polyimide (amongst others). The first and/or second electrical insulating layers 391, 392 typically have a thickness between 0.05 to 0.3 mm, e.g. 0.1-0.2 mm, although other thicknesses are possible. It should also be noted that the thickness of each of the first and second electrical insulating layers 391, 392 does not have to be the same. Although the dielectric material of the first and second electrical insulating layers 391, 392 is electrically insulating, the flex cable should generally be configured to support an efficient transfer of thermal energy between the temperature sensor 394, which is sandwiched between these two insulating layers, and the internal environment of the control unit 320, especially the battery 310, thereby providing a more accurate measure of the current battery temperature. Various potential configurations of the flex cable for supporting this good thermal transfer are described in more detail below.

In the implementation shown in FIG. 4, the conductive layer 393 is provided on a surface of the first electrical insulating layer 391 and enables electrical connection between the battery 310 and the circuit board 315 to provide power from the former to the latter. N.B. it is assumed in FIG. 4 that both terminals of the battery are located adjacent the tip end; however, if one battery terminal is located at each end of the battery, a separate connector (flex or otherwise) may be provided to support the additional electrical link from the circuit board 315 to the nearest end of the battery. The conductive layer 393 may provide further electrical connectivity between various power points and/or signal points within the control unit 320.

The conductor layer 393 is formed from an electrically conductive material, for example, strips of copper deposited as tracks onto the first insulating layer 391. In some embodiments, the number of conductor tracks in conductive layer 393 lies in the range between 2 and 10 (although a flex cable is generally able to support a higher number of tracks if so desired). Such tracks may be provided substantially parallel to one another with a pitch (distance between adjacent conductor strips or tracks) of between 0.5 and 1.5 mm, although the spacing may be greater to accommodate the temperature sensor 394, at least in the region surrounding this sensor. It will be appreciated that these ranges for the number and spacing of tracks are provided by way of example only, and other values may be used.

The ends of the conductive tracks may be provided with suitable pads, lands, etc, for forming electrical connections between the flex cable 390 and other components. For example, the other components may be connected by wires to the flex cable 390, or the flex cable may be configured to connect directly to a connector on another component. The wires or other connectors may be attached to the flex cable, e.g. by soldering, clamping or screwing, etc. In other implementations, a connector might be mounted to the flex cable 390, and the other components can then link into this connector.

As mentioned above, it should be appreciated that FIG. 4 is not to scale, and the conductive layer 393 typically has a thickness less than the thickness of the first and/or second insulating layers. For example, the conductive layer may have a thickness of about 0.05 mm. The relatively thin conductor layer 393 provides flexibility which is compatible with the flexibility of the insulating layers 391, 392 (and hence for the overall connector 390). Note that the space between the tracks of the conductive layer 393 may be filled with a suitable insulator—one possibility is that the first and second insulating layers 391, 392 are bonded to each other in these intervening regions.

The thickness of the flex cable 390 typically is within the range of 0.25 mm to 0.4 mm, e.g. 0.3 mm. The overall thickness may be slightly greater at the location of the temperature sensor 394, e.g. by an additional 0.1-0.2 mm, as the first and second insulating layers 391, 392 flex or distort slightly to accommodate the temperature sensor 394 (or any other similar components, not shown in FIG. 4).

As shown in FIG. 4, the temperature sensor 394 and the conductive layer 393 are sandwiched between the first and second electrically insulating layers 391, 392 in a laminated structure. The temperature sensor 394 may have soldered electrical connections to the conductive tracks in layer 393, or any other suitable form of bonding may be used. These conductive tracks can be used to provide power from the battery to the temperature sensor 394, and may also be used for signaling to/from the temperature sensor.

The temperature sensor 394 is positioned on the first electrical insulating layer 391 such that, when the flex cable 390 is connected between the battery 310 and the circuit board 315, the temperature sensor 394 is located at least close (adjacent) to the battery 310. In some implementations, the temperature sensor may be in direct contact with the battery. For example, the temperature sensor may protrude through one of the laminated layers to contact the battery, or a portion of one of the first or second insulating layers 391 may be omitted (removed) to allow direct contact between the battery and the temperature sensor. Another possibility is that the temperature sensor 394 is in indirect contact with the battery 310 through one of the insulating layers. In any event, the temperature sensor is configured to be in good thermal contact with the battery 310 so as to be able to determine a change in temperature of the battery.

It should be appreciated that any suitable type of temperature sensor can be used as the temperature sensor 394. Typical examples include resistance temperature devices (RTDs) and thermocouple devices. The temperature sensor 394 is sensitive to temperature at least across a specified operating range of the battery 310, for example, 0° C. to 60° C. In operation, the temperature sensor 394 monitors a physical parameter, such as voltage and/or current, that is indicative of the temperature of the battery 310. For example, the temperature sensor 394 may monitor the resistance of a component which varies with temperature, or the voltage output of a thermocouple.

The temperature sensor 394 may be linked by the conductive layer to a controller (e.g. processor, microcontroller, etc) on the circuit board 315. The temperature sensor 394 outputs the measured temperature to the controller, which monitors the temperature, and is used to regulate one or more functions of the electronic aerosol provision system based upon this measured temperature of the battery 310. For example, the controller may shut down or at least reduce the amount of power taken from the battery if the measured temperature is found to be outside the specified operating temperature range of the battery. Note that in other implementations, the temperature sensor 394 itself may be responsible for monitoring whether the measured temperature is within the specified operating temperature range of the battery, and if not, sending a suitable alarm signal to the controller to perform appropriate action(s) in response to this error condition.

Figure 5:
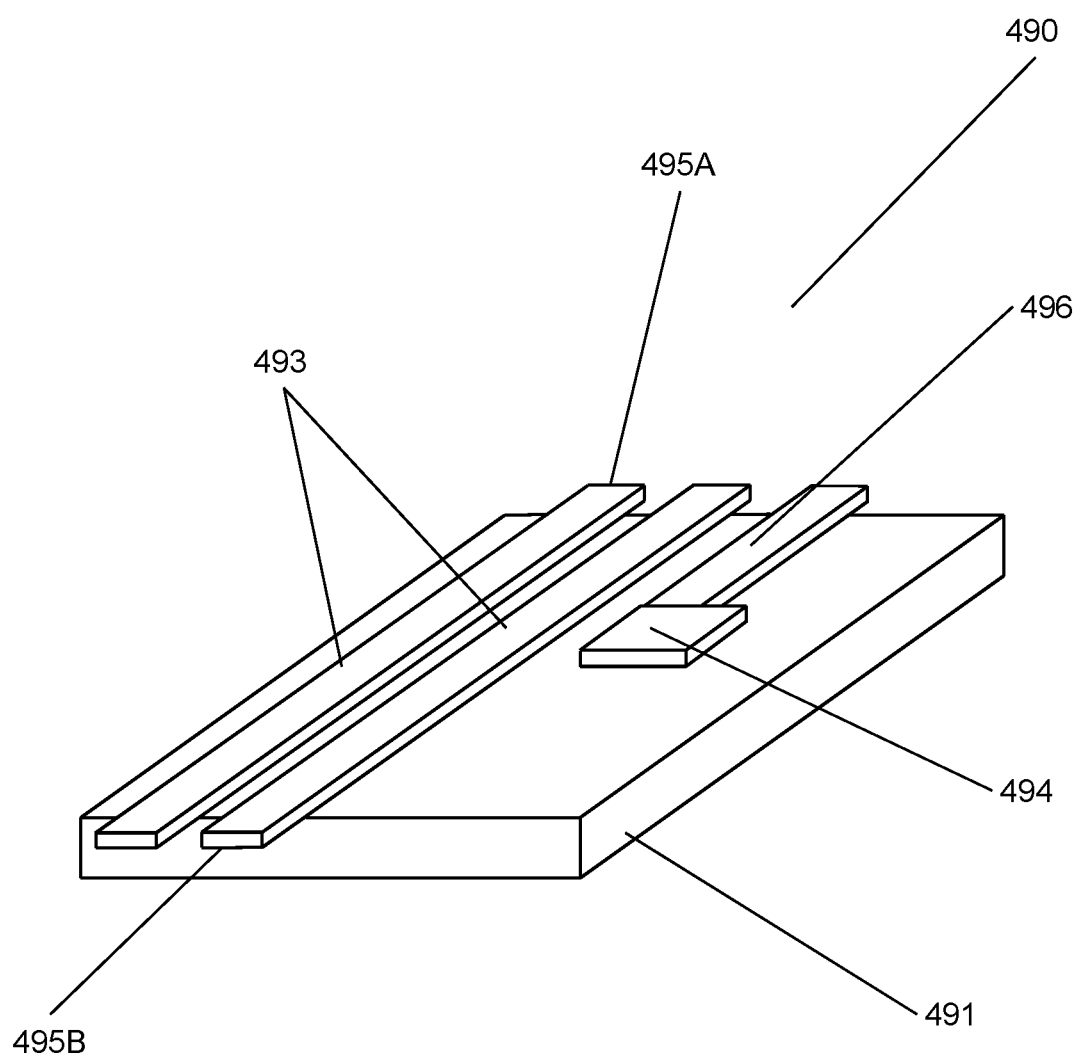
FIGS. 5-7 are more detailed schematic diagrams of the flexible electrical connector having an integrated temperature sensor of FIG. 4 in accordance with various embodiments.

FIG. 5 is a schematic illustration of a portion of an electrical connector 490, having a first electrical insulating layer 491, a plurality of conductor strips 493 and a temperature sensor 494 (these generally correspond to the electrical conductor 390, first insulating layer 391, conductive layer 393 and temperature sensor 394 of FIG. 4, respectively). The electrical connector 490 may be provided with a second insulating layer (not shown in FIG. 5), overlying the conductor strips 493 and corresponding to the second insulating layer 392, however this may be omitted in some embodiments.

In FIG. 5, the plurality of conductor strips 493 include lines 495A and 495B that extend through the portion of the flexible electrical connector 493 shown in FIG. 5. These two lines 495A and 495B may, for example, be used to connect positive and negative terminals on the battery 310 to the circuit board 315 (as shown in FIG. 3). As mentioned above, the power lines 495A, 495B may be provided with suitable connection facilities at each end for this purpose (pad, flip-lock connector, etc.).

FIG. 5 additionally shows (in very schematic form) one possible configuration in which the temperature sensor 494 may be arranged on the surface of the first electrical insulating layer 491. In this configuration, a temperature sensor conductor strip 496 is provided and enables electrical connection of the temperature sensor 494. Note that, conductor strip 496 may comprise multiple individual (separate) lines (not shown in FIG. 5). In addition, although the conductor strip is shown extending in only one direction from temperature sensor 494, it may extend in both directions, depending upon the desired electrical connectivity for the temperature sensor 494.

The conductor strip 496 may provide positive and negative power supply lines to the temperature sensor 494. The power supply could be received from the battery 310 or alternatively from the circuit board 315 (e.g. from a processor on circuit board 315). The power supply to the temperature sensor 494 (or at least one line thereof) may instead branch off from the power supply lines between the battery 310 and the circuit board 315, e.g. by connection to lines 495A and 495B (such connection is not shown in FIG. 5), or utilize a connection to a ground plane (if provided). Another possibility is that the temperature sensor 494 may incorporate its own internal power source, e.g. a small battery.

The temperature sensor 494 will generally be provided, for example as part of conductor strip 496, with at least one output signaling line and (in some implementations) at least one input control line. The signaling line and the input control line will typically link the temperature sensor 494 to the circuit board 315, and more particularly to control functionality located on this circuit board, such as a microcontroller, processor, etc. In some cases the signaling and control may utilize one or more shared lines. In some cases, the signaling and/or control may be implemented over one or both of the power lines, e.g. by using an appropriate modulation scheme to encode signals.

In some implementations, the output signaling link may be used by the temperature sensor to output the measured temperature to the circuit board 315, which is then responsible for monitoring the measured temperature for any out-of-operating range condition. In other implementations, the temperature sensor may use the output signaling link to send an alarm to the circuit board 315 to report an error condition corresponding to an out-of-range temperature measurement (this may include an indication of whether the sensed temperature is too high or too low).

In some implementations, an input control link may be provided and used by the circuit board 315 (or other appropriate control functionality) for example to set, in the temperature sensor 494, upper and lower thresholds for an allowable operating range. In this case, a measured temperature above the upper threshold or below the lower threshold would then trigger an alarm for an out-of-range temperature measurement In some embodiments, the temperature sensor 494 is a resistance temperature detector (RTD), whose resistance is a function of temperature. A fixed reference current may be supplied by the circuit board 315 to the RTD, and the circuit board 315 also monitors the voltage across the RTD. If the battery temperature changes, this will in turn change the temperature, and hence resistance, of the RTD (temperature sensor 494). Accordingly, the voltage monitored by the circuit board (or other suitable facility within the e-cigarette) will change with a change in resistance, and this is indicative of a change in the temperature of the battery 310. In other implementations, the temperature sensor 494 may be a thermocouple device or any other suitable temperature sensor for detecting a temperature variation associated with the battery 310.

Figure 6:
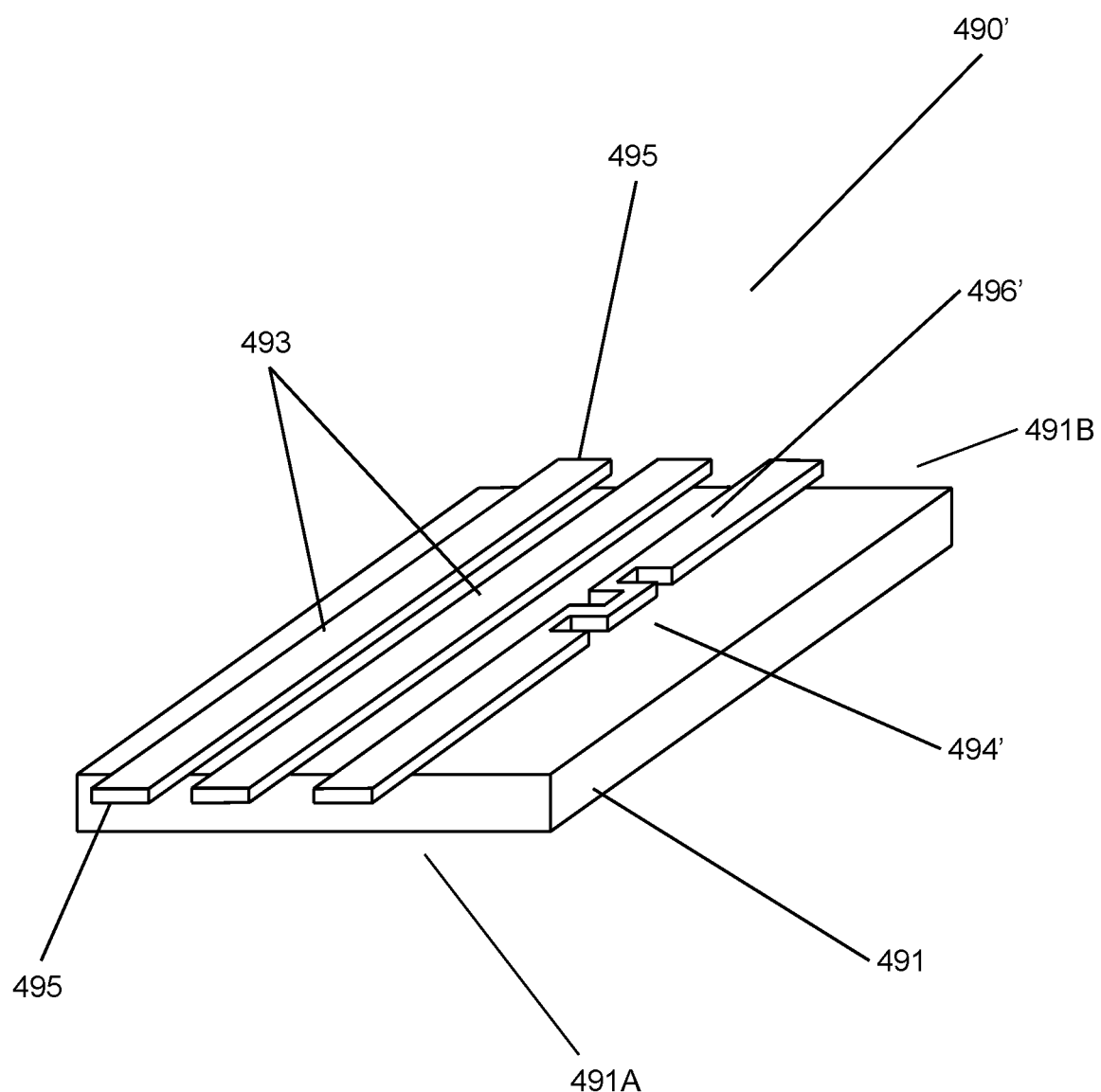

Another implementation of the flexible electrical connector 490' is shown schematically in FIG. 6 (it will be appreciated that flexible electrical connector 490' generally corresponds to flexible electrical connector 490 in FIG. 5, and flexible electrical connector 390 in FIG. 4, with an analogous correspondence for other reference numerals). The temperature sensor 494' is formed within conductive layer 493 by altering the shape, material and/or form (etc) of a conductor strip 496' which connects to the temperature sensor 494'. Forming the temperature sensor 494' within or as part of the conductor strip 496' helps to reduce the overall thickness of the flexible electrical connector 490' (compared, for example, with the configuration of FIG. 5, in which the temperature sensor 494' is formed as an additional component which may be mounted on the conductor strip 496).

In the implementation shown in FIG. 6, the temperature sensor 494' is formed by reducing the width of a portion of the conductor strip 496' (rather than by incorporating a distinct, additional component into the electrical conductor 490'). This reduced width portion has a higher resistance, and so may provide a relatively large proportion of the total resistance along conductor strip 496'. The temperature sensor 494' may be formed from the same material as conductor strip 496' or from a different material—e.g. one which has a greater variation of resistance with temperature—i.e. a higher thermal coefficient of resistivity. In operation, a temperature change impacts the resistance of this reduced width portion, namely temperature sensor 494'. This then allows the temperature change to be detected, e.g. on circuit board 315, by monitoring the overall resistance of conductor strip 496'. Accordingly, the temperature sensor 494' in this implementation can be considered as a form of RTD, and may receive a power supply (for example) directly from the battery 310 or from a component on PCB 315.

Figure 7:
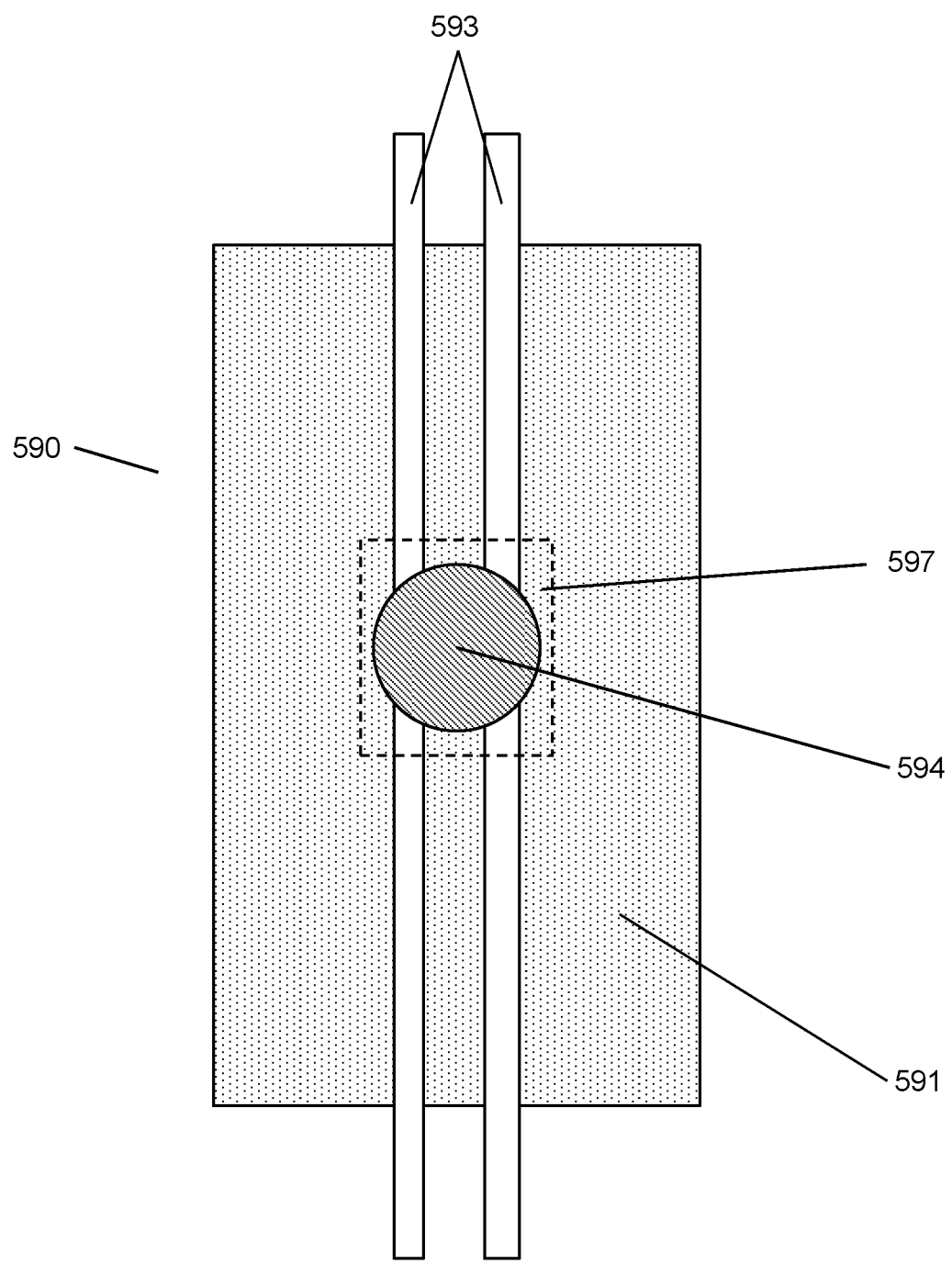

FIG. 7 depicts a simplified schematic view of a further embodiment of an electrical connector 590 as viewed from a direction perpendicular to the plane of the flex cable. The electrical connector 590, a flexible cable, is similar in many respects to the electrical connectors 390, 490, 490' described above. As seen in FIG. 7, conductor strips 593 and a temperature sensor 594 are provided on a substrate 591 comprising a flexible first dielectric material to form a flex cable similar to that of FIGS. 5 and 6. Note that in FIG. 7, the temperature sensor 594 is shown as having a circular shape, but this is schematic, and any appropriate shape for the device may be used, such as rectangular, etc.

The temperature sensor 594 is overlain by a layer or patch of a second material, designated by numeral 597, and shown in dashed outline, so that the temperature sensor 594 is in effect sandwiched between the substrate 591 and the layer 597. The layer 597 of the second material may cover all or just part of the temperature sensor 594, and may also be limited in extent so that it covers only the temperature sensor 594, without extending further over any other areas of the substrate 591. The remainder of the substrate 591 and conductor strips 593 (and temperature sensor 594, if appropriate), may be covered with a third dielectric layer (not shown in FIG. 7), analogous to the flexible dielectric material of layer 392 (see FIG. 4). The patch of the second material 597 can then be considered as a window within the third dielectric layer.

The second material 597 has a higher heat transfer coefficient than the first and/or third dielectric materials 591 (as provided) to allow changes in the temperature of the battery 310 to be transferred through to the temperature sensor 594 more quickly and efficiently (than through the first or third dielectric material), thereby providing more sensitive readings of temperature, and with a better time response to changes in battery temperature.

The second material 597 may be any suitable material that enables good thermal conductivity between the battery 310 and the temperature sensor 594. In addition, the second material 597 may in some implementations be more resistant to heat damage than other components of the flexible connector 590, if it is liable to experience a high temperature from being in contact with battery 310.

The second material 597 may or may not be flexible, since it covers a relatively small area of the substrate 591, and so will not significantly contribute to the overall flexibility of connector 590. In addition, the second material 597 may or may not be dielectric (electrically insulating), depending, for example, on whether the battery surface and/or the temperature sensor are themselves provided with an electrically insulating external surface or coating. In this regard, the choice of material for the second layer 597 may be broader than for the first material layer 591 (or third material layer).

In some implementations, the third dielectric layer may be omitted. In this case the second material 597 may also act as a spacer between the battery and the remainder of the flexible connector 590. In other implementations, the second layer 597 may be omitted, for example, to allow the temperature sensor 594 to directly contact the battery 310 through a suitable window or hole in the third dielectric layer.

In the implementations of FIGS. 5 and 6, the temperature sensor was provided with its own dedicated conductor strip 496, 496'. In other implementations, such as shown in FIG. 7, the temperature sensor 594 may be located, for example, across two conductor strips 593 that are utilized to provide power from the battery 310 to the control board 315. In such a configuration, the temperature sensor 594 may transmit temperature information in the form of a superimposed signal (or modulation) with respect to the power supply (such techniques and protocols for communicating in this way are known in the art and are not discussed in further detail herein); a similar approach could also be used to support control communications to the temperature sensor from the circuit board 315. Further circuit configurations will be apparent to the skilled person—e.g. where the temperature sensor 594 itself directly incorporates a switch to block the transmission of power on conductor lines 593 in the event that the sensed temperature is out of range.

Figure 8:
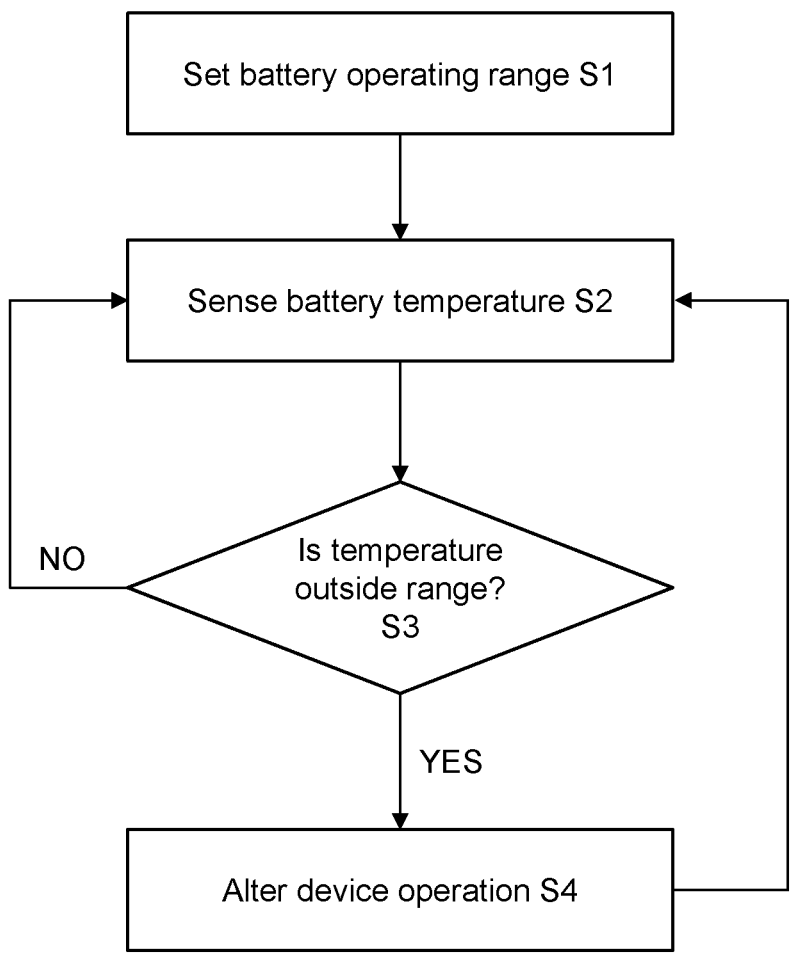
FIG. 8 is a flow chart of a method, such as for use in the electronic aerosol provision system of FIG. 1, for sensing the temperature of the battery and for controlling the electronic aerosol provision system in accordance with the sensed temperature in accordance with some embodiments.

FIG. 8 illustrates a method of operating a control unit 320 for an e-cigarette 10 such as described herein in accordance with some embodiments. A suitable battery operating temperature range is set at S1. This setting is generally performed at the time of manufacture, or automatically after manufacture (e.g. if a new battery unit is inserted, the control unit may access information supplied with the battery about the appropriate operating temperature range).

At S2, the battery temperature is sensed by the temperature sensor 393, 494, 494'. Typically, this involves sensing a physical parameter, e.g. voltage or resistance, which is directly related to temperature. At S3, a check is made to see whether the sensed temperature is outside the specified range—if so, this is considered to be an error condition. For example, the sensed temperature may be continually checked against an upper threshold value which, when surpassed, indicates that the battery 310 is operating at an unsafe temperature (too high). In some embodiments, the upper threshold is set at 50° or 60° C. (for example). The sensed temperature may also be compared against a lower temperature threshold, set (for example) at 0° C. or −5° C. In some embodiments, there may be only a single threshold check (i.e. the specified operating range is unbounded in the upper or lower direction). In some embodiments, the threshold(s) or specified operating range may be dependent on certain other parameters, e.g. ambient temperature, or time, or rate of temperature change. For example, a momentary spike in temperature may be acceptable, but a longer excursion from the specified operating range may trigger an error condition; similarly, a rapid rise in temperature (i.e. greater than a threshold rate) may be considered an error condition in itself, irrespective of whether an upper temperature threshold has yet been breached.

If an error condition is not detected at S3, e.g. the sensed temperature lies within the specified operating temperature range (NO at S3), then the temperature of the battery 310 is regarded as acceptable, and accordingly the e-cigarette 10 continues to function as normal. In the context of FIG. 8, the processing loops back to S2, to indicate an ongoing monitoring of the temperature. Note that there may be a fixed or variable frequency of monitoring, e.g. the rate of sampling the temperature, as per S2, might increase as the sensed battery temperature approaches the edge of the allowed operating range.

If, however, there is an error condition (YES at S3) such that the sensed temperature is outside the specified operating range, e.g. above an upper threshold, then the device operation is altered accordingly at S4. Most typically this will involve reducing or ceasing the supply of power from the battery 310. In some implementations, this control (remedial) action is performed by the circuit board 315 (such as by a processor thereon), which receives the sensed temperature from the temperature sensor, performs the test of S3, and then reduces or ceases the supply of power from the battery accordingly. In some implementations, the functionality of S3 and S4 may be integrated, at least in part, into the temperature sensor itself (although this will tend to be a less flexible approach).

The major consumer of power from the battery 310 is usually the electrical heater 155. Therefore at S4, reducing or ceasing the power supply from the battery to the heater may be the main focus of the remedial action. However a wider shutdown of electrical operations may be required to address an over-temperature situation if, for example, this is caused by a short-circuit somewhere in the control unit 20.

The circuit board 315 may cease the power supply from the battery 310 to the vaporizer 30 by operating a switch which can be located along this supply path. In some implementations, the power supply from the battery 310 to the vaporizer 30 may be subject to pulse width modulation (PWM), whereby the circuit board can increase a duty cycle from zero (no power) up to unity (full power). Some battery units 310 used in e-cigarettes directly incorporate support for such PWM functionality. The circuit board 315 (or other control facility) can therefore reduce the power taken from the battery 310 by reducing the duty cycle of the PWM supply; the power can then be turned off completely by reducing the duty cycle down to zero. In some implementations, if the temperature goes above the specified range, the power taken from the battery 310 might initially be reduced. If the temperature continues to rise (or does not fall), despite this action, then the circuit board 315 might further reduce (or completely cease) the power supply taken from the battery.

Although the above description has focused on an error condition that might arise during vaping, an error condition might also arise in other circumstances—e.g. as part of re-charging the battery 310. In response to an error condition during re-charging, the circuit board 315 (or other appropriate control facility) may reduce or cease the supply of a re-charging current to the battery 310, e.g. by appropriate switching. In addition, in some cases the error condition may be caused by a temperature which is too low, i.e. below a specified operating threshold of the battery. In this case, the circuit board 315 may reduce or cease supply of power from the battery in order to prevent the battery from operating at too low a temperature (which might potentially damage the battery, or cause the e-cigarette to operate only in a degraded fashion, e.g. if not enough power is available from the battery for the vaporizer to function correctly).

The processing of S4 may also include providing some notification of the error condition to the user. For example, the e-cigarette 10 may be provided with one or more lights that can be illuminated in a specific manner (e.g. color, temporal pattern, etc.) to denote an error; likewise the e-cigarette 10 may include an audio output facility to provide a suitable sound warning that an error condition has occurred.

After the error condition is handled at S4 in FIG. 8, the processing returns to S2—in effect the temperature monitoring is continued. Accordingly, if the temperature returns (e.g. falls) to within the specified operating range, then normal operation of the device can resume.

In some implementations, the return to normal operation may be subject to certain conditions and/or processing (in addition to the temperature falling back within the normal operating range). For example, a user might have to perform some specific action, e.g. pressing a reset button (especially for devices in which the error condition is flagged to the user via some suitable audio and/or visual user interface, as described above). The circuit board may also require a predetermined time delay before resuming normal operations, and/or the temperature might have to return to a value which is comfortably within specified operating range (e.g. by a predetermined amount), rather than just enter the very edge of the specified operating range. In some cases, the circuit board may only partly restore power from the battery, e.g. so that the e-cigarette can only resume operations at a reduced power level, at least for an initial time period. Further such conditions may be imposed as appropriate.

The approach described herein therefore provides an electronic aerosol provision system comprising: a vaporizer for generating an aerosol using electrical power; a battery (such as battery 310) for supplying electrical power to the vaporizer and to other components of the electronic aerosol provision system; a flat, flexible cable (such as connector 390) having a laminated structure and incorporating multiple conductor lines for transmitting electrical power and/or signals; and a temperature sensor incorporated into the flat, flexible cable and located adjacent the battery for sensing the temperature of the battery. The electronic aerosol provision system is configured to detect an error condition if the sensed temperature of the battery goes outside a specified operating range, and in response to such detection, to reduce or cease the supply of electrical power from the battery.

In some implementations, the flat, flexible cable includes at least first and second insulating layers. The multiple conductor lines and the temperature sensor are sandwiched between the first and second insulating layers. The system may further include a control facility, and the flat flexible cable includes at least one conductor line for communicating signals between the control facility and the temperature sensor. The control facility is configured to reduce or cease the supply of electrical power from the battery in response to the detection of the error condition, and may also send control commands to the temperature sensor over the cable.

In some implementations, the battery has a longitudinal axis, e.g. the battery is generally cylindrical in shape, such as shown in FIGS. 2 and 4. The flat, flexible cable extends in a direction parallel to said longitudinal axis. In some implementations, and the plane of the flat cable may lie approximately tangential to the external surface of the battery. This can then assist in locating the temperature sensor close to or touching the external surface of the battery for more accurate temperature sensing.

In some implementations, the battery and the flat, flexible cable (plus related functionality) as described herein may be provided in a control unit for an electronic aerosol provision system. Such a control unit can then be connected to a vaporizer to form the (overall) electronic aerosol provision system.

In some implementations, the temperature sensor senses the temperature by incorporating a physical parameter, such as resistance, which is temperature-dependent. In some cases, the temperature sensor itself may measure and/or convert this physical parameter into a sensed temperature reading, on other cases, the measurement and/or conversion may be performed externally. For example, the control circuit board 315 might measure the resistance (physical parameter) of the temperature sensor to derive the sensed temperature from this physical parameter. In some implementations, the detection of the error condition may be derived directly from the measurement of the physical parameter, as a form of temperature reading (but without formal conversion to a temperature value), assuming that the operating temperature range of the battery can be expressed in terms of a corresponding range for the value of the physical parameter.

The approach described herein therefore utilizes a flat, flexible cable (FFC, also flex cable), such as connector 390 in FIG. 4. The FFC may be formed as a laminated cable having two or more flat conductors laid in parallel at a given pitch (separation), and laminated between two layers of dielectric. As described herein, an FFC can be used in an e-cigarette to provide an easy, reliable, flexible and miniaturized connection of multiple signal and/or power points located on different parts of the e-cigarette. For example, the FFC would typically run across the battery cell in the control unit (re-usable segment) of the e-cigarette to transmit electrical power and signals as required. A temperature sensor is integrated within the laminates of the FFC, such as shown in FIG. 4, to monitor the temperature of the e-cigarette battery, primarily for safety reasons.

Integrating the temperature sensor into the FFC in this way has a number of advantages. For example, the temperature sensor has ready access to power lines and signal lines that are already incorporated into the FFC. In addition, the FFC can allow the temperature sensor to be placed immediately adjacent the battery, for accurate and responsive temperature tracking, but the temperature sensor can still be protected (if so required) by one or more laminates of the FFC. Furthermore, the FFC is relatively easy to assemble and fasten into an e-cigarette during manufacture (compared, for example, to assembling an individual temperature sensor and associated wiring). The FFC also represents a compact solution which can readily fit (aided by its flexibility) into the confined internal space of an e-cigarette.

While the above described embodiments have in some respects focused on some specific example aerosol provision systems, it will be appreciated the same principles can be applied to electronic aerosol provision systems using other technologies. For example, the above description has focused on implementations using a two-part e-cigarette 10, but the same approach can be applied to a one-part or a multi-part e-cigarette. In addition, the above description has focused on implementations in which a heater is used to generate vapor from a liquid precursor, but the same approach can be applied to devices in which the vapor precursor is a solid, a paste, or other suitable material, and (or) in which the vapor or aerosol is generated mechanically (rather than by heating). The skilled person will be aware of many other possible implementations.

In order to address various issues and advance the art, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention(s). It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc. other than those specifically described herein, and it will thus be appreciated that features of the dependent claims may be combined with features of the independent claims in combinations other than those explicitly set out in the claims. The disclosure may include other inventions not presently claimed, but which may be claimed in future.

The invention claimed is:

1. An electronic aerosol provision system comprising:
    a vaporizer for generating an aerosol using electrical power;
    a battery for supplying the electrical power to the vaporizer and to other components of the electronic aerosol provision system;
    a flat, flexible cable having a laminated structure and incorporating multiple conductor lines for transmitting at least one of electrical power or signals; and
    a temperature sensor incorporated into the flat, flexible cable and located adjacent the battery for sensing a temperature of the battery;
    wherein the electronic aerosol provision system is configured to:
        detect an error condition if the sensed temperature of the battery goes outside a specified operating range, and
        in response to such detection, reduce or cease the supply of electrical power from the battery.

2. The electronic aerosol provision system of claim 1, wherein the flat, flexible cable includes at least a first insulating layer and a second insulating layer, and wherein the multiple conductor lines and the temperature sensor are sandwiched between the first insulating layer and the second insulating layer.

3. The electronic aerosol provision system of claim 1, further comprising a control facility, and wherein the flat, flexible cable includes at least one conductor line for communicating signals between the control facility and the temperature sensor.

4. The electronic aerosol provision system of claim 3, wherein the temperature sensor is configured to:
    notify the control facility of the sensed temperature over the at least one conductor line for communicating signals between the control facility and the temperature sensor;
    and wherein the control facility is configured to detect an error condition if the sensed temperature of the battery goes outside the specified operating range.

5. The electronic aerosol provision system of claim 3, wherein the temperature sensor is configured to:
    detect an error condition if the sensed temperature of the battery goes outside the specified operating range; and
    notify the control facility that the error condition has been detected over the at least one conductor line for communicating signals between the control facility and the temperature sensor.

6. The electronic aerosol provision system of claim 3, wherein the control facility is configured to reduce or cease the supply of electrical power from the battery in response to the detection of the error condition.

7. The electronic aerosol provision system of claim 3, wherein the control facility is configured to transmit a control command to the temperature sensor over the at least one conductor line for communicating signals between the control facility and the temperature sensor.

8. The electronic aerosol provision system of claim 3, wherein the conductor lines of the flat, flexible cable are used for supplying electrical power from the battery to the control facility.

9. The electronic aerosol provision system of claim 3, wherein the conductor lines of the flat, flexible cable are used for supplying electrical power to the temperature sensor from at least one of the battery or from the control facility.

10. The electronic aerosol provision system of claim 1, wherein the temperature sensor is a resistance temperature detector.

11. The electronic aerosol provision system of claim 1, wherein one end of the flat, flexible cable is connected to at least one terminal of the battery.

12. The electronic aerosol provision system of claim 1, wherein the conductor lines of the flat, flexible cable are used for supplying electrical power from the battery to the vaporizer.

13. The electronic aerosol provision system of claim 1, wherein the battery has a longitudinal axis and the flat, flexible cable extends in a direction parallel to the longitudinal axis.

14. The electronic aerosol provision system of claim 1, wherein the battery has an external surface and the flat, flexible cable is approximately tangential to the external surface of the battery.

15. The electronic aerosol provision system of claim 1, wherein the battery is re-chargeable, and wherein, in response to a detected error condition that the sensed temperature of the battery has gone outside the specified operating range, the electronic aerosol provision system is configured to reduce or cease a supply of electrical power to the battery for re-charging the battery.

16. The electronic aerosol provision system of claim 1, further comprising at least one of an audio user interface or a visual user interface for notifying a user of a detected error condition.

17. The electronic aerosol provision system of claim 1, wherein the temperature sensor directly contacts the battery.

18. The electronic aerosol provision system of claim 1, wherein the temperature sensor provides a physical parameter which is temperature-dependent.

19. A control unit for use with an electronic aerosol provision system comprising a vaporizer for generating an aerosol using electrical power, the control unit comprising:
- a battery for supplying electrical power to the vaporizer and to other components of the electronic aerosol provision system;
- a flat, flexible cable having a laminated structure and incorporating multiple conductor lines for transmitting at least one of electrical power or signals; and
- a temperature sensor incorporated into the flat, flexible cable and located adjacent the battery for sensing a temperature of the battery;

wherein the control unit is configured to:
- detect an error condition if the sensed temperature of the battery goes outside a specified operating range, and
- in response to such detection, reduce or cease the supply of electrical power from the battery.

20. A method of operating an electronic aerosol provision system comprising a vaporizer for generating an aerosol using electrical power, the method comprising:
- supplying electrical power from a battery to the vaporizer and to other components of the electronic aerosol provision system;
- sensing a temperature of the battery using a temperature sensor incorporated into a flat, flexible cable and located adjacent the battery, wherein the flat, flexible cable has a laminated structure and incorporates multiple conductor lines for transmitting at least one of electrical power or signals;
- detecting an error condition if the sensed temperature of the battery goes outside a specified operating range; and
- in response to such detection, reducing or ceasing the supply of electrical power from the battery.

* * * * *